United States Patent
Given

[11] 3,924,240
[45] Dec. 2, 1975

[54] SYSTEM FOR CONTROLLING PROCESSING EQUIPMENT

[75] Inventor: Arthur P. Given, Roanoke, Va.

[73] Assignee: General Electric Company, Salem, Va.

[22] Filed: Apr. 9, 1973

[21] Appl. No.: 349,016

[52] U.S. Cl. .................. 340/172.5; 179/15 AL
[51] Int. Cl.² .............................. G06F 9/18
[58] Field of Search .... 340/172.5; 179/15 AL, 18 J, 179/15, 18

[56] References Cited
UNITED STATES PATENTS

| 3,345,611 | 10/1967 | Eachus | 340/172.5 |
| 3,411,143 | 11/1968 | Beausoleil et al. | 340/172.5 |
| 3,432,813 | 3/1969 | Annunziata et al. | 340/172.5 |
| 3,518,632 | 6/1970 | Threadgold et al. | 340/172.5 |
| 3,697,959 | 10/1972 | Abramson et al. | 340/172.5 |
| 3,710,324 | 1/1973 | Cohen et al. | 340/172.5 |

Primary Examiner—Gareth D. Shaw
Assistant Examiner—Michael C. Sachs
Attorney, Agent, or Firm—Robert E. Brunson; Arnold E. Renner

[57] ABSTRACT

A control system for use with processing equipment includes a controller and a plurality of addressable terminal devices including means for transferring data between the processing equipment and the controller over a common bus.

13 Claims, 9 Drawing Figures

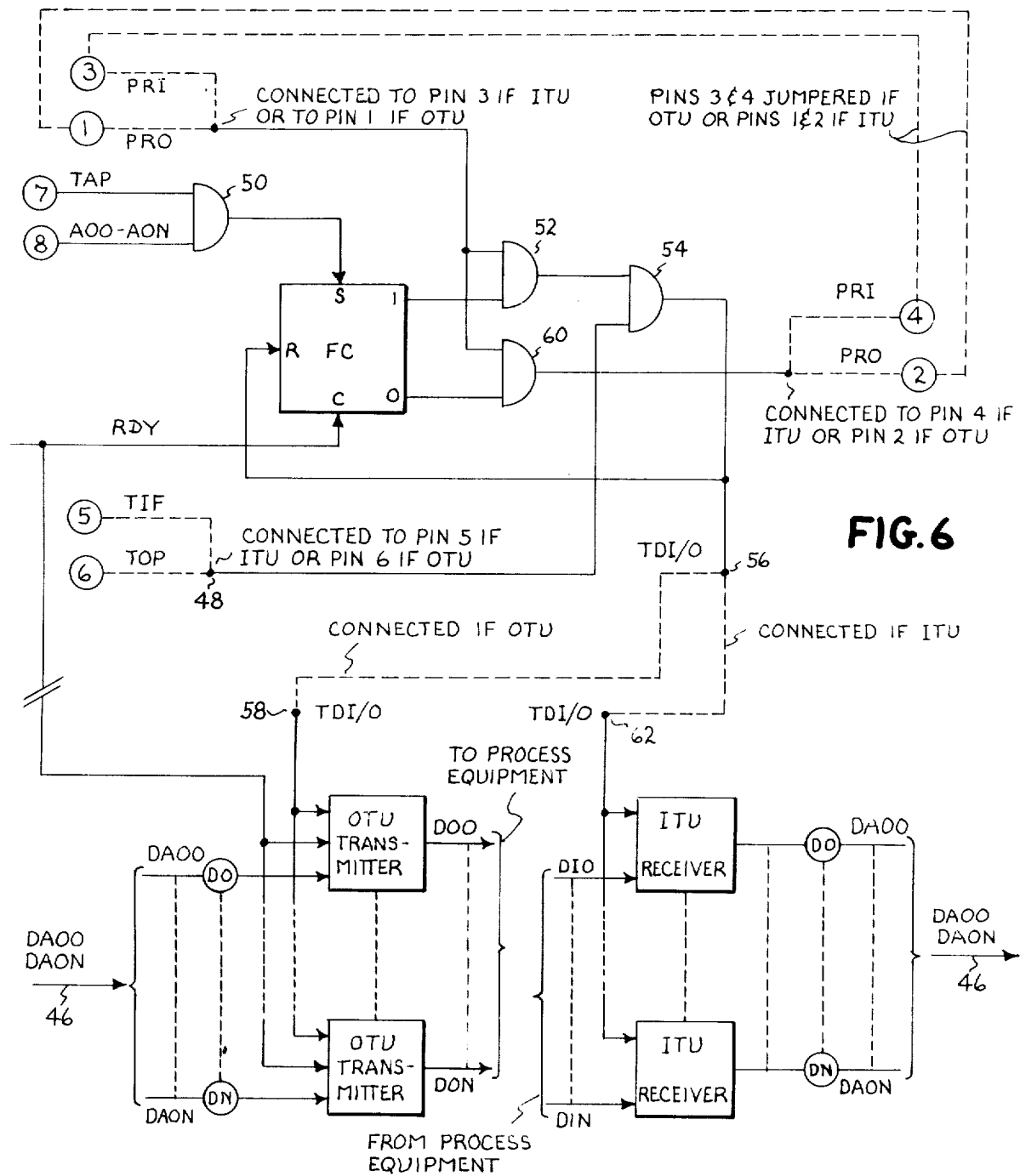

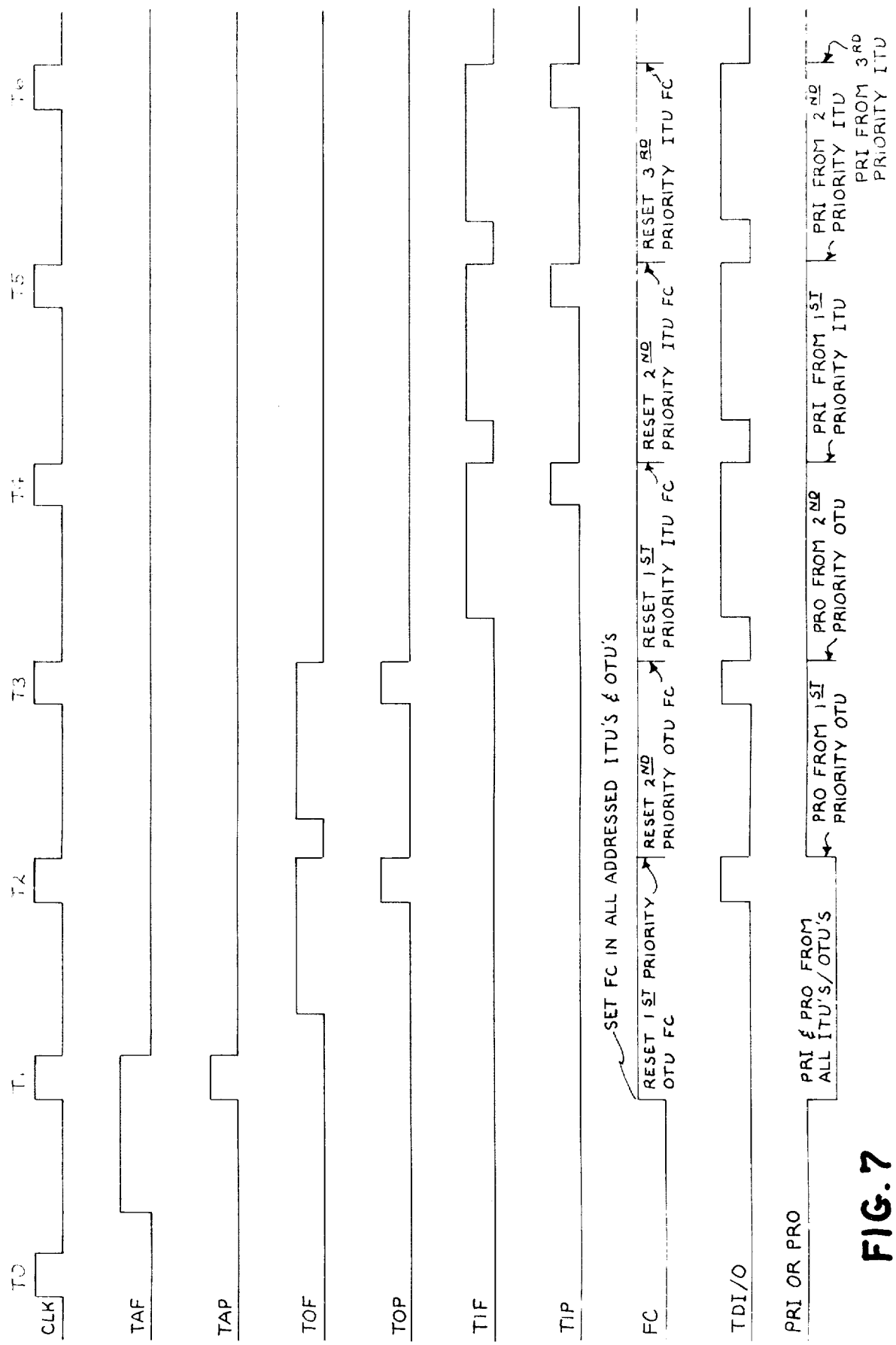

SYSTEM FOR CONTROLLING PROCESSING EQUIPMENT

BACKGROUND OF THE INVENTION

This invention relates generally to data processing and process control systems and more particularly to control systems of the type for transferring data between a processor or controller and processing equipment for controlling the latter.

1. Field of the Invention

In the field of automated industrial control, digital computers or controllers are utilized to receive input data from processing equipment, perform calculations on the input data and provide output data for controlling the processing equipment. The input data from the processing equipment to the controller is normally transferred through some type of addressable data transfer device. After calculations have been performed on the input data by the controller, it provides output data through the data transfer device to control the processing equipment.

The field of this invention relates to control systems utilizing such data transfer devices having application in data processing and control systems for controlling various types of processing equipment.

2. Description of the Prior Art

For various reasons process control systems frequently utilize a common bidirectional signal interface bus for interfacing a computer or controller to a plurality of remote terminal devices which are connected to processing equipment. Each of these remote terminal devices normally includes an input portion and an output portion for transferring data between the controller and the processing equipment. In order to provide an orderly transfer of this data, these remote terminals are normally addressable over the interface bus from the controller. For each input data transfer function to be performed, the controller must provide one of the remote terminals with an address which causes the data to be transferred through the addressed terminal into the controller. When it is desirable to perform an output data transfer function, the controller must then again provide another address to a particular terminal causing output data to be transferred from the controller to the processing equipment. Thus, it can be seen, for each input or output data transfer function to be performed the controller must provide an address to a specified remote terminal.

In most process control systems there are times when it is desirable to perform logical functions on the contents of sampled input data from the processing equipment. For example, it may be desirable to perform a logical OR function of the input data provided to the controller through two separate remote terminals. When this type of function is to be performed, it is first necessary to address both remote terminals in a sequential fashion and then, after the input data from each of the terminals is in the controller or computer, proper instructions are executed to perform the logical OR function and derive the result.

Also, in process control systems, it is frequently desirable to provide output data in the form of control signals to control the processing equipment while simultaneously providing the same signals to some remote location such as an operator display console so that the operator may observe the condition or states of the signals going to the equipment. In prior art process control systems, in order to accomplish this, the controller must generate two addresses. That is, the controller must first address one remote terminal to transfer the output data to the processing equipment and then address another remote terminal which is connected to the operator console to display the information previously sent to the processing equipment.

In various types of process control systems it is frequently necessary to transfer large amounts of input and output data very rapidly between the controller and the processing equipment. When these types of data are in digital form, the number of wires in the signal bus and the amount of logic in the remote terminals increases for each bit of information to be transferred. For example, it may be desirable to transfer 24 bits of input data or output data very rapidly between the processing equipment and the controller. In order to make these transfers in the most rapid way possible, a design engineer would logically provide in the remote terminal 24 separate input terminals and output terminals and associated logic which connect to 24 data wires on the signal bus to transfer the data into or out of the controller 24 bits at a time. The remote terminal must be addressed for each 24 bits of data to be transferred. If it is desirable to transfer more than 24 bits of data in a successive manner the controller must readdress the remote terminal for each 24 bits to be transferred.

In these prior art process control systems the requirement for continued readdressing for each input and output data transfer function becomes time consuming. The need, therefore, exists for a control system for expediting the transfer of data between processing equipment and a computer or controller whereby information may be transferred in large quantities by a minimal amount of addressing of remote terminals.

SUMMARY OF THE INVENTION

The present invention overcomes these problems of the prior art by providing a control system for use with processing equipment comprised of a processor or controller which interfaces over a common bus with a plurality of remote terminal devices connected in parallel to the bus and the processing equipment. The bus conveys various address and data signals between the terminal devices and the controller.

Each of the terminal devices contains a common or terminal interface means containing decode means and routing logic for addressing the terminal devices and for transferring input and output data between the bus and the processing equipment. Enabling means or control logic is also provided in each of the terminal devices for generating various enabling or control signals for controlling the addressing and the data transfer sequencing. Each terminal device is capable of containing a plurality of data transfer units of two types, an input type and an output type. Each of the data transfer units is selectively addressable from the terminal interface means in each of the terminal devices. When the controller generates a system address on the signal bus, each of those data transfer units in the various terminal devices receiving a designated address will be latched in a selected state. Immediately following the system address, the controller may generate either an output data transfer function or an input data transfer function. In the case of the output transfer function, the controller will transfer data, via the signal bus, through one or more of the output types of data transfer units to the processing equipment. Subsequent to the output data transfer function, the controller may generate an input data transfer function, at which time those selected input types of data transfer units will transfer the data from the processing equipment into the controller.

The terminal devices of the present invention each include an input priority means and an output priority means which allows associated ones of the input and output data transfer units to be interconnected in a predetermined priority data transfer sequence.

The decode means within each of the terminal devices is selectable whereby any one or more of the data transfer units may recognize the same address. This makes it possible to simultaneously select or address more than one terminal device. For example, in the case of an output data transfer function, a single address may be transferred down the bus from the controller to select one or more of the data transfer units in one or more of the terminal devices. The output data following the address is thus transferred, simultaneously, through the selected data transfer units to the processing equipment. In a similar fashion, input data may be simultaneously transferred to the bus via a plurality of selected input type data transfer units. This simultaneous input data transfer capability makes it possible to perform a logic OR function of a plurality of input data bits from the processing equipment. This logic OR function may be performed when two or more input data transfer units are selected with the same address. When the data input bits are transferred through each of the input data transfer units, they are simultaneously OR'ed to the bus, with the result being transferred into the controller. Thus, the present invention provides a logic function capability which takes the place of logic OR functions heretofore done by instructions or software in process computer control systems.

As will be seen, the invention provides a more rapid way of transferring data between a controller and processing equipment by providing means responsive to a single address for sequentially transferring input and output data on a priority basis between the controller and the processing equipment. The data processor or controller used in the present system may be of any number of well-known programmable types for use in process control systems. Also, the invention offers the advantage of providing a plurality of like terminal devices in combination with a bus interface which is usable with various types of controllers adapted to that interface.

It is, therefore, an object of the present invention to provide a system for controlling processing equipment having enhanced data transfer capabilities.

It is another object of the invention to provide a control system having a plurality of simultaneously addressable remote terminal devices connected in parallel to a common signal bus for transferring data between processing equipment and a programmable data processor or controller.

It is another object of the invention to provide a process control system having a controller for generating a single system address for simultaneously addressing a plurality of remote terminal devices for transferring input and output data on a priority basis between the controller and processing equipment.

Still another object is to provide a process control system having a plurality of remote terminal devices each including input and output data transfer units for sequentially transferring data through the units on a priority basis between processing equipment and a controller.

Another object is to provide a plurality of remote terminal devices each having addressing and data transfer means for selectively transferring data between processing equipment and a controller in response to system addresses provided to the terminal devices.

Still another object is to provide a plurality of remote terminal devices in a process control system wherein each of the devices contains address decode means and a plurality of input and output data transfer units interconnected in a priority data transfer sequence for the transfer of input and output data between a controller and processing equipment.

Still another object is to provide a control system having a plurality of remote terminal devices connected in parallel to a bidirectional bus for multiplexing of input and output data between a controller and processing equipment connected to the terminal devices.

The foregoing and other objects will become apparent as this description proceeds and the features of novelty which characterize the invention will be pointed out in particularity in the claims annexed to and forming a part of this specification.

BRIEF DESCRIPTION OF THE DRAWING

The present invention may be more readily described and understood by reference to the accompanying drawing in which:

FIGS. 6 and 6A collectively comprise a logic schematic of a one of the input data transfer units for use in the connecting means of FIG. 5.

FIGS. 6 and 6B, similarly to FIGS. 6 and 6A, collectively comprise a logic schematic of an output data transfer unit for use in the connecting means of FIG. 5.

FIG. 7 is a timing diagram showing the interrelationships between various signals in the control system and is useful in understanding the operation of the invention.

DESCRIPTION OF THE PREFERRED EMBODIMENT

Figure 1:
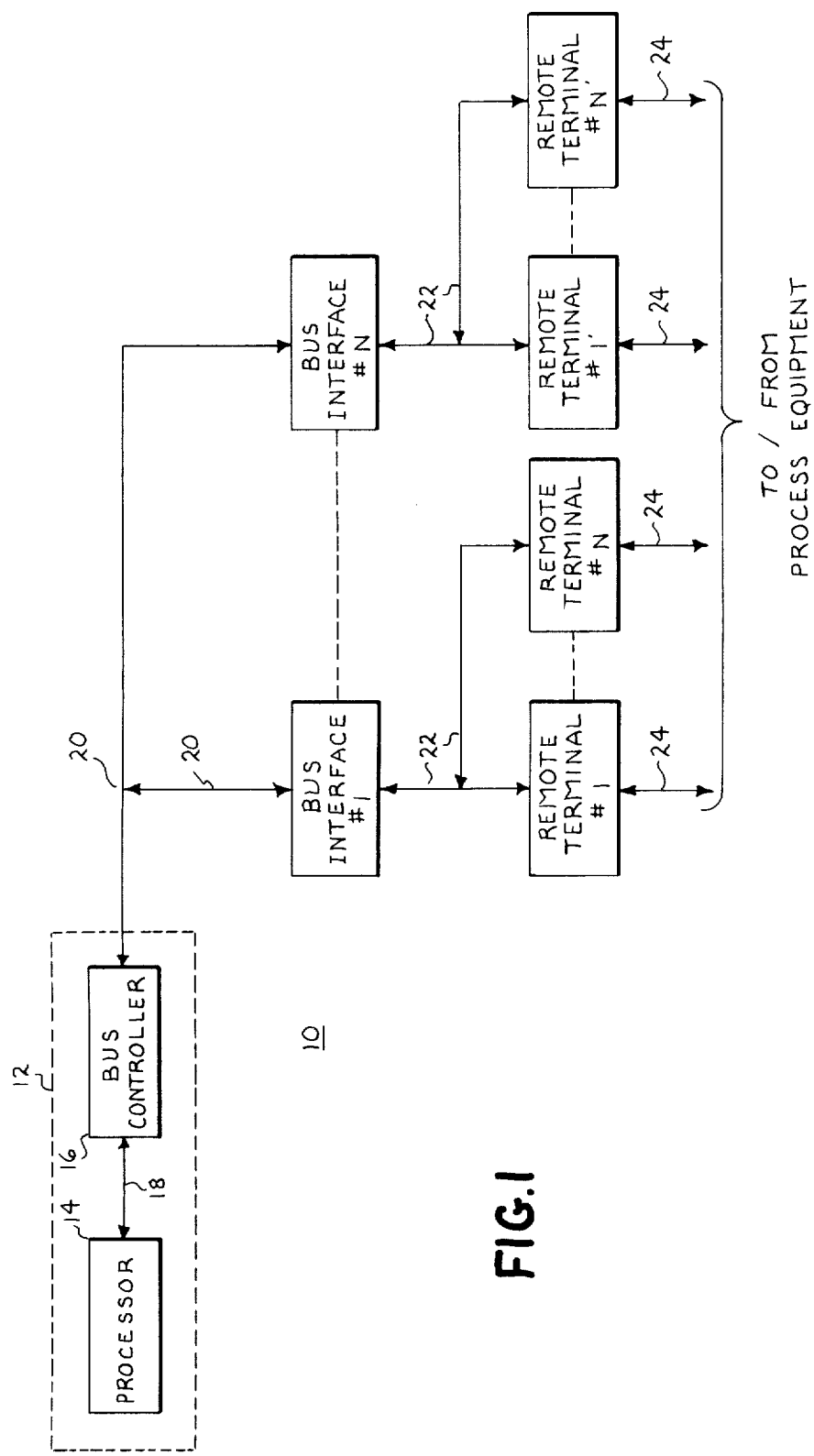
FIG. 1 is a block diagram of a control system incorporating remote terminal devices in accordance with the invention.

Reference is now made to FIG. 1 which shows a data processing or control system 10 in accordance with the present invention. A control means 12, such as a digital controller, includes a processor 14, such as a programmable data processing unit, and a bus controller 16. The processor 14 communicates with the bus controller 16 via a plurality of control and data lines 18. The processor 14 provides output data to the bus controller for transfer to processing equipment whereas input data is provided to the processor over lines 18 from the bus controller. Processor 14 and bus controller 16 may be of any suitable design for generating the proper output data and control signals and for receiving input data signals via a common input/output signal bus 20 in a sequence to subsequently be described. The signal bus 20 is connected at one end to the bus controller 16 and each one of a plurality of bus interface units designated No. 1 – No. N are connected in parallel to the bus.

Each of the bus interface units, (No. 1 – No. N), serves to selectively transfer input and output data between the controller 12 and a plurality of remote terminal devices designated No. 1 – No. N. Timing and control or function signals are also provided to each of the bus interface units via signal bus lines 20, as well as system address signals. A plurality of bus interface lines 22 are associated with each of the bus interface units. Lines 22 establish communication with several terminal devices No. 1 – No. N. which are connected in parallel with each of the bus interface units.

Terminal devices No. 1 – No. N each include a plurality of input and output data lines 24 connected to external processing equipment not shown. Input data signals to the terminal devices may come from various apparatus such as sensors, switch closures, relay contacts, storage devices, etc., whereas output data signals provided from the terminal devices to the processing equipment may be utilized to actuate solenoids, operate console display devices, control logic elements, etc.

Figure 2:
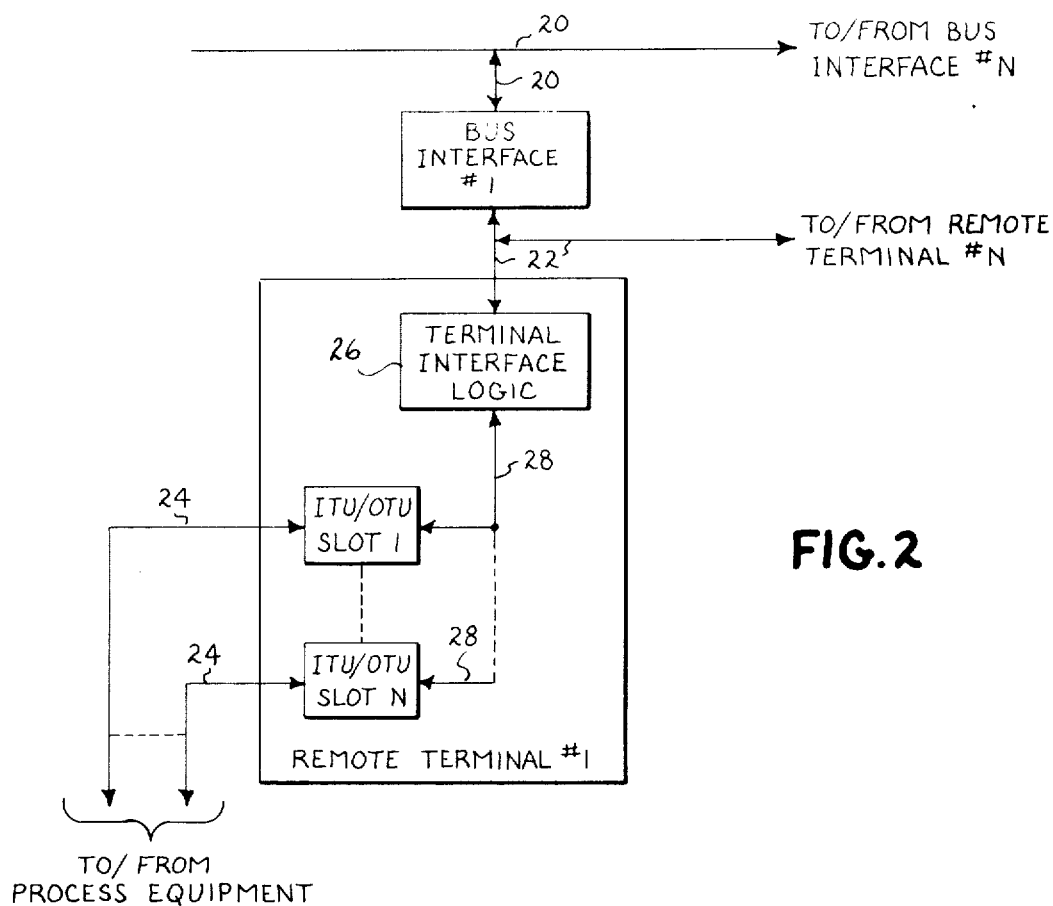
FIG. 2 is a block diagram showing the common signal bus connected through a bus interface means into a plurality of remote terminal devices in accordance with the invention.

Reference is now made to FIG. 2 which shows in block diagram form the remote terminal device No. 1, which is exemplary of each of the other terminal devices. The bus interface No. 1 is connected via bus interface lines 22 to a terminal interface logic 26. Terminal interface logic 26 comprises an address or decode means for selectively generating and routing a plurality of output selection signals via a plurality of address and data conductors 28 to a plurality of connecting means or plug-in circuit connectors shown as slots 1 – N. Slots 1 – N may contain either an input data transfer unit or an output data transfer unit shown in the slots as ITU/OTU. In addition, the terminal interface logic 26 contains means for transferring output data from the bus 20 to the processing equipment or for transferring input data from the processing equipment to the bus 20.

In accordance with the invention, the type of data transfer unit included in any given slot is determined by whether that slot is to receive data from or transfer data to the processing equipment. There is no mandatory order in which the two types of data transfer units must fit into the slots of the terminal devices. The reason for this will become clear as the ensuing description proceeds.

Figure 3:
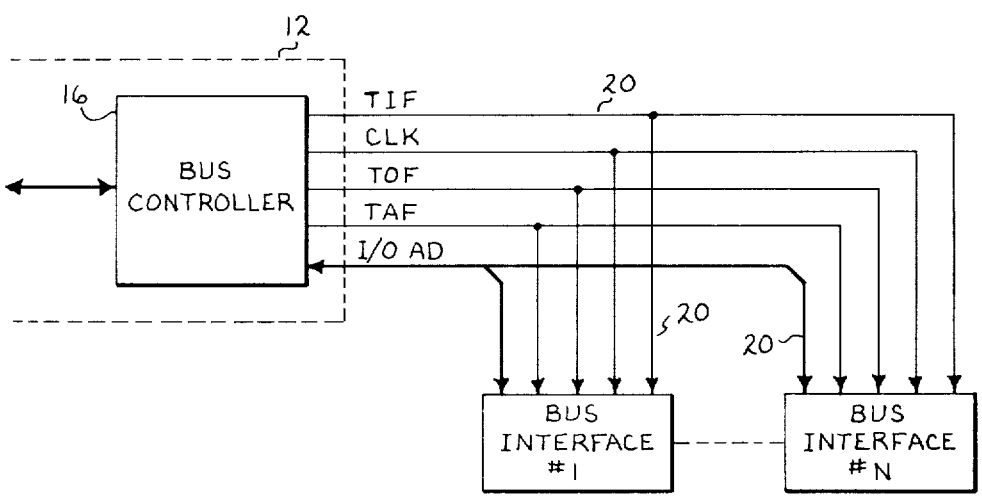
FIG. 3 is an exemplary drawing showing a bidirectional signal bus usable with the invention.

Prior to proceeding with a further description of the invention, reference is now made to FIG. 3 which shows in detail the common signal bus 20 interconnecting each of the bus interfaces No. 1 – No. N into the controller 12. Bus 20 is comprised of basically four control lines for conveying signals designated TIF, CLK, TOF and TAF. Additionally, the bus includes a plurality of input/output address data lines I/OAD having bidirectional signal characteristics. These latter lines are timeshared to provide signals representative of addresses and output data to each bus interface unit and to carry input data therefrom to the controller 12.

The line carrying a clock signal CLK is connected to each of the bus interface units No. 1 – No. N to control the system timing for the various operations performed by each of the terminal devices. A transfer address function signal TAF is generated by a controller 12 during an addressing phase or first period of time for transferring a system address on the I/OAD lines into each of the terminal devices No. 1 – No. N via their corresponding bus interface units No. 1 – No. N. Whenever output data is to be transferred to the processing equipment a transfer output function signal TOF is generated by the controller 12 and applied to each of the bus interface units along with the output data on the I/OAD lines to clock the output data through the bus interface and the previously addressed output data transfer units (OTU's) to the processing equipment. When input data is to be transferred from the processing equipment to the controller 12, the controller generates a TIF (transfer input function signal) on bus 20. The TIF signal is applied via each of the bus interface units to their corresponding terminal devices. The TIF signal effects a transfer of the input data, via the I/OAD lines, from those input data transfer units (ITU's) previously addressed via the I/OAD lines.

Figure 4:
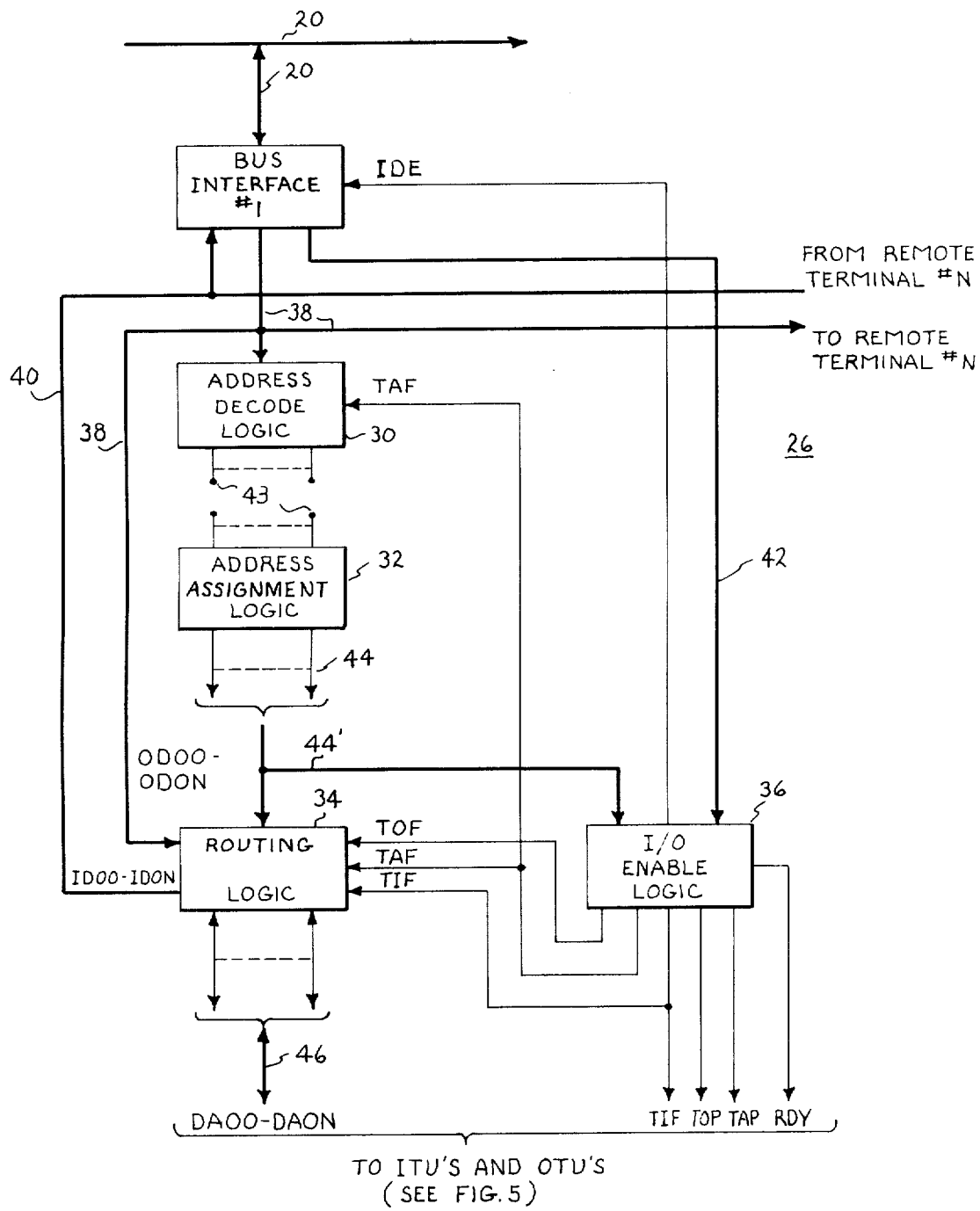
FIG. 4 is a logic diagram of the common terminal interface logic of a one of the remote terminal devices as connected into an associated bus interface means.

The common or terminal interface logic 26 of FIG. 2 is shown in more detail in FIG. 4. Bus interface No. 1 is again shown connected into the common interface logic 26 of remote terminal No. 1. The terminal interface logic 26 of each of the remote terminal devices is comprised of a decode means comprising an address decode logic 30 and an address assignment logic 32, a routing logic 34 and an input/output (I/O) enable logic 36. The bus interface or information lines 22 as shown in FIGS. 1 and 2 is partially comprised of address and output data lines 38. During the addressing phase the address information on bus 20 is provided to the input of the address decode logic 30 via lines 38. The decode logic 30 is a standard type of decode network for generating a plurality of output address signals in response to various combinations of input address signals. Typical circuits suitable for constructing the decode logic 30 are documented in an engineers reference manual entitled MC MOS, copyright 1971 by Motorola Inc., Semiconductor Products Division. In that manual a circuit type MC14515 is shown. This circuit is a 4-bit latch 4 to 16 line decoder capable of decoding 4 input address signals into 16 decoded output signals. One or more of these circuits can be used to construct the address decode logic 30, the number being determined by the number of address signals to be decoded.

Bus interface lines 22 are also comprised of a plurality of input data lines 40 which provide input data from the routing logic 34 to the controller 12 via the bus interface and bus 20. Additionally, interface lines 22 include a plurality of control conductors 42 for providing the TIF, CLK, TOF and TAF signals to the I/O enable logic 36 via the bus interface. An additional control conductor considered as part of bus interface lines 22 provides a signal IDE (input data enable) from the I/O enable logic 36 to the bus interface. The IDE signal is generated when data is transferred from the processing equipment to the controller.

Disposed between the address decode logic 30 and the address gating logic 32 is an address select or jumper means 43. Jumper means 43 serves to interconlect one or more address signals from the address decode logic 30 to the address assignment logic 32. The combination of the address decode logic 30 and address assignment logic 32 allow sevral address or selection signals to be simultaneously generated on a plurality of address lines 44 in response to a single system address provided to the input of the address decode logic 30. The address lines 44 are shown as collectively being applied on address lines 44' to the input of the routing logic 34 and the I/O enable logic 36.

The address assignment logic may be constructed of circuit type MC14,001L, Quad 2-input "NOR" gate found in the previously referenced MC MOS manual. Each MC14001L is comprised of four 2-input NOR gates for receiving the decoded outputs on pins 43 from the address decode logic 30. The number of circuits utilized in the assignment logic 32 is determined by the number of input signals to be decoded.

Figure 5:
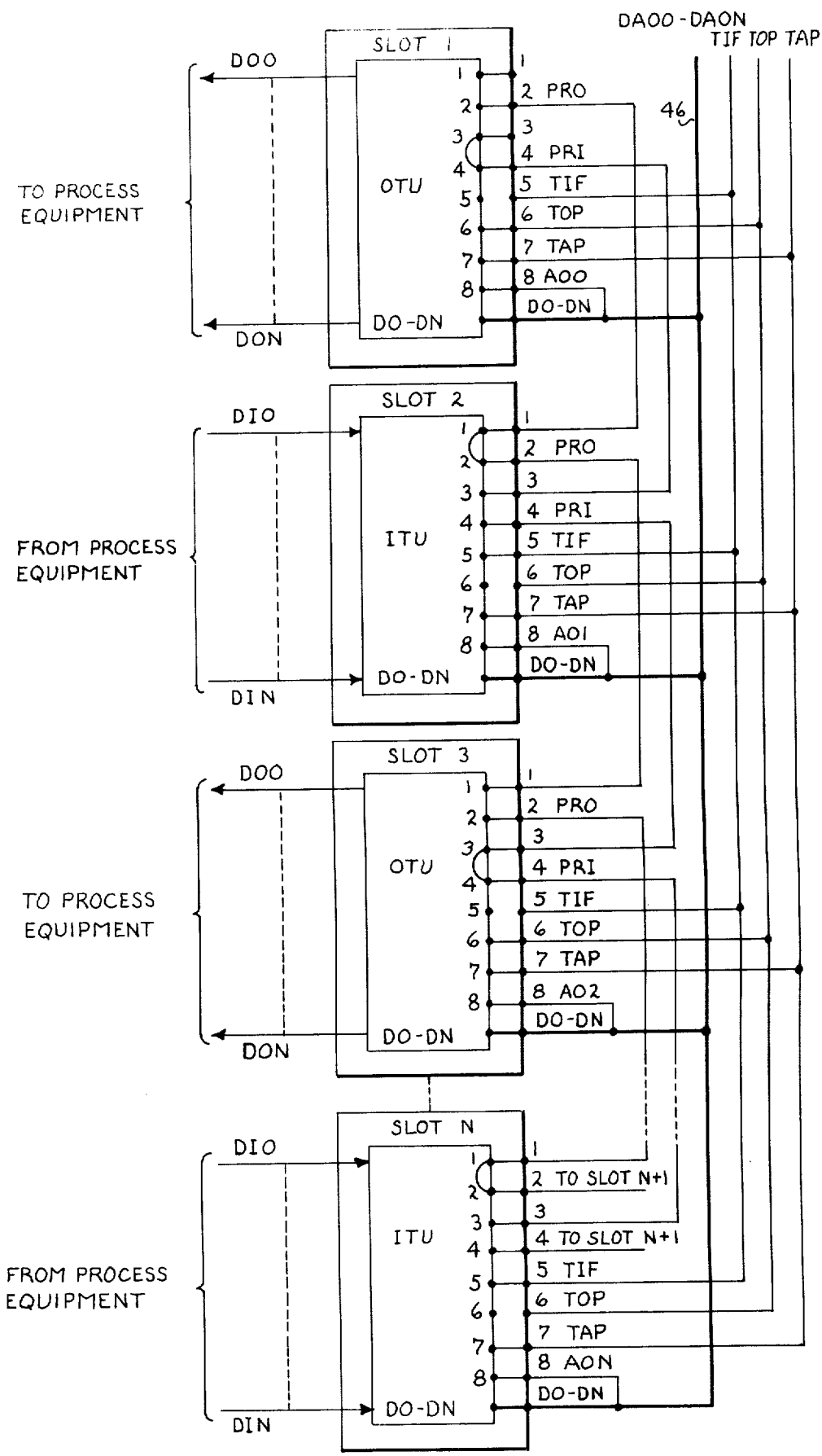
FIG. 5 is an electrical schematic in accordance with the invention showing various signal lines from the common terminal interface logic of FIG. 4 as connected into a plurality of connecting means including the data transfer units.

During an addressing phase of the invention, the addressing signals on conductors 44' are utilized to enable the I/O logic 36 to generate the proper enable signals for transferring the address signals through the routing logic which in turn are presented as address or selection signals to designated ones of the data transfer units on conductors 46 (FIG. 5). The data transfer units (ITU's and OTU's) are of the self-latching type. As a result, once the selection signal is applied to the inputs of these various units they will latch-up, recognizing the fact that they have been addressed or selected. After the addressing phase, the address signals on conductors 44' and 46 are no longer needed. Immediately following the addressing phase, either an input data transfer function (TIF) or an output data transfer function (TOF) signal may be generated to initiate a transfer of data. Assume that immediately following the addressing phase it is desirable to transfer output data from the controller to the output data transfer units (OTU's). This accomplished by the generation of one or more of the transfer output function signals TOF. The TOF signal enables the routing logic 34 to pass the output data from the bus interface via lines 38, to the previously designated or selected output data transfer unit(s). After the output data has been transferred, to one or more of the transfer input function signals TIF are generated to enable the routing logic 36 to transfer the input data from the designated input data transfer units on conductors 40 to the bus 20 via the bus interface.

The data and addressing information flowing between the routing logic 34 and each of the data transfer units is designated on conductors 46 as signals DAOO-DAON. Referring to FIGS. 4 and 5, a plurality of control signals from the I/O enable logic 36 are applied to each of the slots 1 - N. These control signals are comprised of the transfer input function signal TIF and three additional signals designated TOP (transfer output pulse), TAP (transfer address pulse) and RDY (ready).

In FIG. 5, each of the slots 1 - N are the same and each is adapted to include either an ITU or an OTU. The TIF signal is applied on a common conductor to pin 5 of each of the slots, the TOP signal is applied on a common conductor to each of the slots at pin 6, and the TAP is also applied to pin 7 on a common conductor to each of the slots. The data and address signals DAOO-DAON on conductors 46 are likewise applied to a plurality of input pins designated DO-DN on each of the slots 1 - N. It is significant to note that each of the slots, such as slot 1, receives an address or selection signal (AOO) on a conductor at pin 8. Thus, when an address signal appears at pin 8 of either of the slots the data transfer unit (ITU or OTU) included therein is selected.

During the output data transfer phase of the invention, the data appearing on conductors 46 at pins DO-DN of each slot is transferred through the designated OTU's to provide output signals DOO-DON to the processing equipment. In a similar fashion, during the input data transfer phase, input data designated DIO-DIN is transferred through the designated ITU's to data lines 46 via pins DO-DN.

In FIG. 5 there is also shown two priority lines for carrying priority output signals PRO and priority input signals PRI. The PRO from pin 2 of slot 1 provides a priority input signal to pin 1 of slot 2. It will be noted that each slot provides the output signal PRO at pin 2 to pin 1 of the next succeeding slot such as shown in slot 2 to 3 and slot 3 to N. In a similar fashion, the PRI signal is provided as an output from pin 4 of slot 1 to pin 3 of slot 2, etc. This dual bus priority scheme allows data to be transferred on a sequential priority basis during the input and output data transfer phases respectively through the designated input and output transfer units from the highest priority unit to the lowest priority unit.

Reference is now made to FIGS. 6, 6A and 6B. FIG. 6 shows in detail selection and priority logic for either an ITU or an OTU. FIG. 6 in combination with FIG. 6A comprises an ITU and FIG. 6 in combination with FIG. 6B comprises an OTU. In accordance with the invention, the two circuits are preferably fabricated to form either an ITU or an OTU. Considering FIGS. 6 and 6A in combination with he ITU in slot 2 (FIG. 5), it can be seen that when the ITU circuit is fabricated the proper connections must be made for the ITU to receive the TIF signal and to interconnnect pins 1 and 2 to allow the PRO signal from the OTU in slot 1 to propagate therethrough to slot 3. To provide these connections, pin 5 is connected to a junction 48 and pin 6 is left disconnected. Also, a jumper wire is fabricated into the ITU, jumpering pins 1 and 2 as shown by the dashed lines in FIG. 6. Additionally, the ITU contains a plurality of ITU receivers as shown in FIG. 6A. A transfer data input/output signal TDI/O is connected from FIG. 6 to FIG. 6A by connecting points 56 and 62 as indicated by the dashed line to enable the ITU receivers to transfer their input data DIO-DIN therethrough to pins DO-DN and to lines 46.

Referring to slot 3 of FIG. 5 and to FIG. 6, it will be noted that when the OTU circuit is fabricated jumper is placed on the circuit between pins 3 and 4 to allow the PRI signal to propagate through each OTU. Additionally, the TIF signal on pin 5 is left disconnected and pin 6 is connected at junction 48 to provide the TOP signal to the OTU. The TDI/O signal is connected to a plurality of OTU transmitters in FIG. 6B by connecting points 56 and 58 together as shown by the dashed line. These transmitters are of the self-latching type which will take on the states of their respectively applied input signals DAOO-DAON at pins DO-DN from lines 46. For example, when the DAOO signal is a binary 1, the corresponding OTU transmitter output DOO will achieve a binary 1 when the TDI/O signal is applied to the transmitter. These transmitters also receive a reset or ready input signal RDY from the I/O enable logic 36 in FIG. 4. The RDY signal is a function of the clock signal CLK of FIG. 7. The I/O enable logic may contain, for example, a capacitor, integrator type network which receives the CLK signal. If the integrator network is kept charged up by a repetitive application of the CLK signal, the RDY signal will remain in the inactive state, having no effect on the OTU transmitters. However, if for any reason, such as a system power failure or because of an interruption in the CLK signal, the integrator network will cause the RDY signal to change state, applying a reset signal to the OTU transmitters and preventing any erroneous data from being transmitted to the processing equipment.

The operation of the logic of FIG. 6 is the same whether fabricated as an OTU or an ITU. Therefore, the operation of the logic of FIG. 6 will be explained configured only as an OTU. Let it be assumed that as soon as power is applied to the system that the RDY signal is applied to a C or clear input terminal of a flip-flop FC placing it in a reset state. Simultaneously, the RDY signal is applied to each of the OTU transmitters (FIG. 6B), placing them in their reset states. Let it now be assumed that the controller begins to generate the CLK signal. As soon as a predetermined number of the CLK signals have been received, the RDY signal becomes inactive, removing the reset signal allowing the system to go into normal operation.

During the addressing phase, the TAP signal at pin 7 is applied to an AND gate 50 in conjunction with a one of the address or selection signals AOO-AON at pin 8 of the OTU. The address applied to AND gate 50 will be dependent upon which slot the OTU occupies. The TAP and address signals enable AND gate 50 applying a set signal to an S terminal to set flip-flop FC causing it to generate a binary 1 output signal from its 1 output terminal. The binary 1 signal from flip-flop FC is applied to an AND gate 52 in conjunction with a binary 1 PRO input signal on pin 1. Referring to FIG. 5, it will be noted that pins 1 and 3 in slot 1 are left disconnected. This leaves the PRO input to AND gate 52 floating in the highest priority slot allowing AND gate 52 to be enabled each time the flip-flop FC achieves a set state. With flip-flop FC now in the set state AND gate 52 is enabled applying a binary 1 signal to an AND gate 54. When the transfer output pulse TOP is applied to pin 6 AND gate 54 is enabled generating the transfer data input or output signal TDI/O. The TDI/O signal is applied from point 56 to point 58 in FIG. 6B. As previously described, the TDI/O signal will cause the OTU transmitters to each take on either a set or a reset state in accordance with states of the input data DAOO-DAON on conductors 46. It is at this time (TDI/O) that the OTU transmitters have their data DOO-DON clocked to the processinng equipment.

Reference is now made back to FIG. 6 to the output of AND gate 54. The TDI/O signal is applied back to an R or reset terminal of the FC flip-flop to reset it on the trailing edge of the TDI/O signal, thus deselecting the OTU and preparing it to be addressed at the next addressing phase. An AND gate 60 is connected to a zero output terminal of the FC flip-flop, and also receives the PRO input signal. When flip-flop FC was in the set state its 0 output terminal was a binary 0. Thus, AND gate 60 was kept in the disabled state providing a binary 0 disable output signal at pin 2. Referring to FIG. 5, the binary 0 PRO signal is applied through pins 1 and 2 of the ITU in slot 2 to pin 1 of the OTU in slot 3. Thus, the binary 0 PRO signal prevents AND gates 52 and 60 in the OTU of slot 3 from being enabled until after the data has been transferred through the OTU of slot 1. However, with the flip-flop FC in the reset state AND gate 60 is now enabled generating a binary 1 PRO signal. The binary 1 PRO signal, as shown in FIG. 5, propagates down the PRO priority bus through pins 1 and 2 of slot 2 into pin 1 and to AND gates 52 and 60 of the OTU in slot 3. If the FC flip-flop in the OTU of slot 3 is set, the PRO binary 1 signal will enable AND gate 52. If the FC flip-flop in slot 3 is reset the PRO signal will instead enable AND gate 60 to provide another PRO binary 1 signal to pin 1 of slot N. Assuming that flip-flop FC in slot 3 is set, AND gate 52 will be enabled and the second TDI/O signal will be generated from AND gate 54 upon the occurrence of a second TOP signal. In this manner, data from the second highest priority OTU (slot 3) is clocked to the processing equipment. Should it be desirable to clock data out of more than two OTU's as just described in connection with FIGS. 5, 6 and 6B, it would merely be necessary to connect pin 2 coming out of the ITU in slot N to pin 1 of additional slots N + 1 in a manner as shown in FIG. 5.

By observing FIGS. 5, 6 and 6A it can be seen that the logic for the ITU will function in the same manner as the OTU wherein the priority input signal PRI is utilized to sequentially enable each of the ITU's on a priority basis to transfer their input data from the processing equipment into the controller. The main difference between an OTU and an ITU is that the receivers in the ITU are passive which will merely pass their input data (DIO-DIN) to lines 46 when the TDI/O signal is applied from AND gate 54.

Prior to proceeding with a further description of the invention, it is considered advantageous at this time to consider the sequence of operations which take place within the system. Reference is now made to FIGS. 3 and 7. As previously described in connection with FIG. 3, the bus controller 16 or the controller 12 generates the various timing and control or function signals for controlling the transfer of data and addresses over the bus 20. The sequence of generation of these signals is shown in FIG. 7. The logic for the development and the generation of these various signals is not shown herein as it is considered to be obvious to one having ordinary skill in the art that by utilizing the timing diagram of FIG. 7 one could design suitable logic for implementation into the controller 12 to generate these signals.

In the timing diagram of FIG. 7, basically three phases or periods of time are shown. These are a first period defined as a transfer address phase, a second period defined as an output data transfer phase and a third period defined as an input data transfer phase. In the operation of the invention, the repetitive clock signal CLK defines a plurality of intervals each interval being shown by pulses T0 through T6. CLK is the basic clock signal utilized to time all address and data transfer operations which take place between the remote terminal devices and the controller. The first function signal to be generated is the TAF signal which occurs at some time between T0 and T1 and remains positive until the termination of T1. It is during this positive period of TAF that the system address signals are placed on the I/OAD lines of bus 20. Referring to FIG. 4, it can be seen that the TAF signal and the address signals are passed through bus interfaces No. 1 - No. N wherein the address signals are applied to the address decode logic 30 via lines 38 and the TAF signal is applied to the I/O enable logic 36 on one of the conductors 42. The TAF signal is passed directly through the I/O enable logic 36 and simultaneously applied to the routing logic 34 and the address decode logic 30. The TAF signal is utilized to gate the address from lines 38 through the address decode logic 30, jumper pins 43 and through the address assignment logic 32. The address is thus applied via conductors 44 and 44' to the routing logic 34 and the I/O enable logic 36. The TAF signal present at the input of the routing logic 34 gates at least one selection signal out of the routing logic via conductors 46 to simultaneously select one or more of the ITU's and OTU's in slots 1 – N (FIG. 5).

In FIG. 4, the address signals on lines 44' applied to the I/O enable logic 36 comprise signals representative of every conceivable address or selection signal which may come out of the address gating logic 32. These address signals are combined with the TAF signal and with the clock signal T1 during the addressing phase to generate a TAP (transfer address pulse) output signal from the I/O enable logic 36. The TAP signal as shown in FIGS. 5 and 6 is applied simultaneously to each of the ITU's and OTU's at pin 7 to select each of the designated OTU's and ITU's receiving an address or selection signal on their corresponding inputs at pin 8.

The number and combinnation of OTU's and ITU's to be selected during the addressinng phase is determined by the interconnections of the jumper pins 43 between the address decode logic 30 and the address assignment logic 32. For example, if it is desirable select only the OTU in slot 1, the jumper pins 43 will be interconnected to provide an address signal AOO to pin 8 of slot 1 when a specified address is applied to the decode logic 30. On the other hand, if it is desirable to address both of the OTU's in slots 1 and 3, the jumper pins will be interconnected to provide a selection signal to pin 8 of each of the OTU's whenever a specified address is applied to the decode logic 30. That is, a select signal AOO will be applied to pin 8 of slot 1 and a select signal AO2 will be applied to pin 8 of slot 3. From the preceding examples it can be seen how it is possible to select any desirable combination of OTU's and ITU's in the various remote terminal decives merely by interconnecting the proper pins 43.

Reference is now made back to FIG. 7. Immediately following the TAP signal, the transfer output function signal TOF is generated by the controller and applied to each of the bus interface units No. 1 through No. N along with the output data. During one interval of the period that the TOF signal is positive, the output data is placed on the I/OAD lines (FIG. 3) from the bus controller and applied, via the bus interface, to the routing logic 34 on lines 38. Simultaneously, the TOF signal is applied on one of the lines 42 to the I/O enable logic 36. The TOF signal is passed directly through the I/O enable logic to the routing logic, gating the output data ODOO-ODON on lines 38 through the routing logic to lines 46.

In the I/O enable logic 36, the clock signal T2 on one of the lines 42 is combined with the TOF signal to generate a transfer output pulse TOP. The TOP signal is applied to pin 6 of each of the slots 1 – N FIG. 5). As previously explained, each of the OTU's is connected via the pins 6 in their corresponding slots to gate the output data on lines 46 through the selected OTU as output data signals DOO-DON.

If it is assumed that the OTU's in slots 1 and 3 have both been selected, the data will be transferred on a higher to lower priority basis, first out of the OTU in slot 1 and then out of the OTU in slot 3. This is accomplished under control of a dual priority means in each of the terminal devices. One of these priority means comprises the priority logic in each of the OTU's for selectively generating the priority out signal PRO (reference is made to AND gate 60 in FIG. 6). As shown in FIG. 5 the PRO signal is sequentially connected from pin 2 of each slot to pin 1 of the next succeeding slot. In those slots containing an ITU, pins 1 and 2 on the ITU's are jumpered. This allows the PRO signal to propagate through the slots including ITU's for application to the priority logic in each of the OTU's included in the various slots. Let it be assumed that the TOP signal has just effected the transfer of the output data through the OTU in slot 1. Due to this transfer, the PRO signal from slot 1 is generated as a binary 1 and passed through pins 1 and 2 of that ITU in slot 2 and to pin 1 of slot 3. The PRO signal at pin 1 of the OTU in slot 3 (FIG. 6) enables the OTU to tranfer its data to the process equipment upon the occurrence of the second TOF signal as shown in FIG. 7. This second TOF signal, which occurs at the interval defined by T2 and T3, effects the transfer of information through the OTU in slot 3 in the same manner as just described for the first TOF and TOP signals from the I/O enable logic 36.

Immediately following the output data transfer phase, the controller 12 enters the input data transfer phase by generating a transfer input function signal TIF having an interval defined by T3 and T4. The TIF signal is applied over bus 20, through each bus interface and to the I/O enable logic 36 in each of the terminal devices (FIG. 4). The TIF signal is passed through the I/O enable logic as one input to the routing logic and to pin 5 of each of the slots in FIG. 5. Assume that the ITU's in slots 2 – N have both been selected. The TIF signal will first cause the ITU in slot 2 to transfer its input data (DIO-DIN) to bus 46 and to the routing logic. The routing logic, presently enabled by the TIF signal, passes the input data IDOO-IDON on lines 40 to the bus interface. The bus interface gates the input data to the common bus 20 in response to an input data enable signal IDE generated by the I/O enable logic. The IDE signal is present as an enable signal at the bus interface during the TIF period.

As shown in FIG. 7, a transfer input pulse TIP is generated during the period of the TIF signal. The TIP signal does not appear on any of the figures except FIG. 7, and is shown to be a signal internally generated in the controller 12 for gating the input data into the controller from the bus 20 on lines I/OAD. Immediately following the generation of the first TIF signal and second TIF signal and a TIP signal may be generated at the interval defined by T4 and T5. Following the second TIF signal, third TIF and TIP signals may also be generated during the interval of T5 and T6. It is during these additional intervals of the input data transfer phase that input data is sequentially transferred through the ITU's in slots N and N + 1, the latter slot not shown in FIG. 5. This latter slot being indicated at the output of pins 4 of slot N by the showing of the PRI signal going to slot N + 1.

Upon the termination of the input data transfer phase, the process just described may then be repeated by a subsequent generation of the TAF signal to provide an additional system address to each of the remote terminals.

The I/O enable logic 36 may be readily constructed from a plurality of MC14011L circuits found in the previously referenced Motorola Inc. MC MOS publication. These circuits are each comprised of four 2-input "NAND" gates which can readily be connected to generate the output signals TIF, TOF, TAF, TOP and TAP from the I/O enable logic 36 in accordance with the preceding description.

The routing logic 34 may be constructed of representative circuits found in a reference entitled RCA COS/-MOS Integrated circuits Manual, copyright 1971. This representative circuit is shown in that manual as type CD4016. The circuit is comprised of four bilateral switches capable of being interconnected to transfer the addressing and data signals through the routing logic in response to the TOF, TAF and TIF signals applied thereto as previously described.

From the previous description, it can now be seen how the present invention makes it possible to effect the logical OR of a plurality of input data bits from various ones of the ITU's to the common bus 20. This possible because each of the remote terminal devices can be simultaneously addressed with the same address. For example, referring to FIGS. 2 and 4, assume that the jumper pins 43 in two or more of the terminal devices are set up to simultaneously address one or more ITU's in each of the devices. During the addressing phase, the address will be transferred into each of these designated ITU's, thus causing them to latch-up to receive input data from the processing equipment. When the TIF signal is generated, the input data will be simultaneously transferred through each of the designated ITU's and appear at their respective bus interface units for transfer to the common bus 20. The simultaneous application of the input data from these units is a logical OR of each of the bits of data coming from the respective ones of the ITU's.

Although the operation of the invention has been described as going through first an addressing phase, then an output data transfer phase, followed by an input data transfer phase, it can readily be seen how the data transfer phases can be reversed. The only thing being necessary to this reversal is that the addressing phase be initiated prior to any data transfer phase.

It is further readily apparent how the present invention provides the capability of being able to transfer large blocks of data either into or out of the controller by merely addressing a plurality of remote terminal devices with a single address and then following this address with input and output data transfer phases each having as many transfer intervals as is required for transferring the desired amount of data.

While the principals of the invention have now been made clear in the preferred embodiment, there will be immediately obvious to those skilled in the art many modifications of structure, arrangement, proportions, the elements, materials, and components used in the practice of the invention and otherwise which are particularly adapted for specific environments and operating requirements without departing from those principals. The appended claims are, therefore, intended to cover and embrace such modifications within the limits only of the true scope of the invention.

What is claimed is:

1. In a data processing system including a data processor and remote processing equipment, a control system comprising:
   a. a controller in communication with the data processor and responsive to commands generated by the data processor for,
      1. generating system address signals,
      2. generating functions signals, and
      3. conveying data between the data processor and the remote processing equipment;
   b. a bus connected to said controller for conveying the system address signals, the function signals and data; and,
   c. a plurality of simultaneously addressable terminal devices connected in parallel to said bus and further connected to the processing equipment for selectively directing the transfer of data via said bus between the processing equipment and the data processor, each of said terminal devices comprising,
      1. at least one data transfer unit for directing the transfer of data between the data processor and processing equipment,
      2. decoding means responsive to prescribed system address signals to generate selection signals, each of said selection signals identifiying an individual data transfer unit, and
      3. routing logic interconnecting said bus and said data transfer unit, said routing logic responsive to said selection signals from said decoding means for routing a selection signal to each individually identified data transfer unit during a first time period as defined by a first one of said function signals to thereby address each identified data transfer unit and further responsive to additional function signals during time periods subsequent to said first time period for routing data over said bus between the data processor and the processing equipment, via an identified data transfer unit.

2. A control system of the type recited in claim 1 further including a plurality of bus interface means each serving to connect at least one of said terminal devices to said bus for passing said system address signals to said decoding means during said first time period and responsive to a one of said function signals to allow data to be selectively transferred in either direction over said bus between the data processor and the processing equipment.

3. A control system of the type recited in claim 1 wherein each of said terminal devices further comprises, enabling means responsive to function signals on said bus and to said selection signals provided by said decoding means for selectively providing enabling signals to said decoding means, said routing logic and said data transfer unit to control the generation of said selection signals to thereby address a data transfer unit and to effect the transfer of data between the processing equipment and the data processor.

4. A control system of the type recited in claim 1 wherein the data transfer unit of said terminal devices includes a priority means, the priority means of like input or output types of data transfer units being interconnected via their associated data transfer unit whereby each data transfer unit has a relative data transfer priority with respect to another data transfer unit of like type to sequentially effect the transfer of data through like types on a higher to lower priority basis in response to a corresponding one of the additional function signals repetitively applied to the priority means of said like types.

5. In a data processing system including a data processor and remote processing equipment, a control system comprising:
   a. a controller in communication with the data processor and responsive to commands generated by the data processor for,
      1. generating system address signals,
      2. generating function signals, and
      3. conveying data between the data processor and the remote processing equipment;
   b. a bus connected to said controller for conveying the system address signals, the function signals and data; and,
   c. a plurality of simultaneously addressable terminal devices connected in parallel to said bus and further connected to the processing equipment for selectively directing the transfer of data via said bus between the processing equipment and the data processor, each of said terminal devices comprising,
      1. enabling means responsive to selection signals and to the function signals to selectively generate a plurality of enabling signals having time periods defined by the function signals,
      2. at least one data transfer unit for directing the transfer of data between the data processor and the processing equipment, said data transfer unit having a select means for enabling the selection thereof in response to a selection signal and a first enable signal at a first time period defined by a first one of the functon signals,
      3. decoding means responsive to prescribed system address signals and to the first function signal to provide the selection signals to said enabling means, each of said selection signals identifiying an individual data transfer unit and further serving to enable the generation of the other enabling signals at time periods defined by the other function signals applied to said enabling means, and
      4. routing logic interconnecting said bus and said data transfer unit said routing logic responsive to the first function signal for routing a selection signal to the individually identified data transfer unit to enable said selection means in the data transfer unit of the individually selected data transfer unit in accordance with the system address signals applied to said decoding means and further responsive to additional enabling signals during time periods subsequent to said first time period for routing data over said bus between the processing equipment and the data processor, via an identified data transfer unit.

6. A contol system of the type recited in claim 5 further including a plurality of bus interface means connected in parrallel to said bus and further connected in parallel to a plurality of terminal devices for:
   a. passing the system address signals during a first time period defined by a first one of the function signals;
   b. passing the function signals; and,
   c. selectively transferring data in either direction over said bus between the data processor and the processing equipment in response to a one of the additional enabling signals during the time periods subsequent to the first time period.

7. A control system of the type recited in claim 5 wherein the data transfer unit of said terminal devices includes a priority means, the priority means of like types of data transfer units being interconnected via their associated data transfer unit whereby each data transfer unit has a relative data transfer priority with respect to another data transfer unit of like input or output type to sequentially effect the transfer of data through like types on a higher to lower priority basis in response to a corresponding one of the additional enabling signals repetitively applied to the priority means of said like types.

8. In a data processing system including a data processor and remote processing equipment, a control system comprising:
   a. a controller in communication with the data processor and responsive to commands generated by the data processor for,
      1. generating system address signals,
      2. selectively generating function signals, and
      3. conveying data between the processing equipment and the data processor;
   b. a bus connected to said controller for conveying the system address signals, the function signals and data;
   c. a plurality of bus interface means connected in parallel to said bus for,
      1. passing the system address signals during a first time period defined by a first one of the function signals,
      2. passing the function signals, and
      3. selectively transferring data in either direction over said bus between the data processor and the processing equipment in response to a one of additional ones of the function signals during time periods subsequent to the first time period;
   d. a plurality of simultaneously addressable terminal devices connected in parallel to a corresponding one of said bus interface means and further connected to the processing equipment for selectively directing the transfer of data between the processing equipment and the data processor via a connected bus interface means and said bus, each of said terminal devices comprising,
      1. at least one data transfer unit for directing the transfer of data between the data processor and the processing equipment,
      2. decoding means responsive to prescribed system address signals from a connected bus interface means to generate selection signals, each of said selection signals identifying an individual data transfer unit,
      3. routing logic interconnecting said bus interface means and said data transfer unit, said routing logic responsive to said selection signals from said decoding means for routing a selection signal to the individually identified data transfer unit during the first time period as defined by the first one of said function signals to thereby address a data transfer unit and for selectively and sequentially routing data in either direction through those identified like types of input or output data transfer units as controlled by a series of the additional function signals selectively and repetitively applied to the data transfer units during time periods subsequent to said first time period.

9. A control system of the type recited in claim 8 wherein each of said terminal devices further comprises, enabling means responsive to function signals from said bus interface means and to said selection signals provided by said decoding means for selectively providing enabling signals to said decoding means, said routing logic and said data transfer unit to control the generation of said selection signals to thereby address a data transfer unit and to effect the transfer of data between the processing equipment and the data processor.

10. A control system of the type recited in claim 8 wherein the data transfer unit of said terminal devices includes a priority means, the priority means of like types of data transfer units being interconnected via their associated data transfer unit whereby each data transfer unit has a relative data transfer priority with respect to another data transfer unit of like type to sequentially effect the transfer of data through like types on a higher to lower priority basis in response to a corresponding one of the additional function signals repetitively applied to the priority means of said like types.

11. In a data processing system including a data processor and remote processing equipment, a control system comprising:
   a. a controller in communication with the data processor and responsive to commands generated by the data processor for,
      1. generating system address signals,
      2. selectively generating function signals, and
      3. conveying data between the processing equipment and the data processor;
   b. a bus connected to said controller for conveying the system address signals, the function signals and data; and,
   c. a plurality of simultaneously addressable terminal devices connected in parallel to said bus and further connected to the processing equipment for selectively directing the transfer of data via said bus between the processing equipment and the data processor, each of said terminal devices comprising,
      1. at least one data transfer unit for directing the transfer of data between the data processor and the processing equipment, each data transfer unit including addressable selection means responsive to a selection signal during a first time period defined by a first one of the function signals for enabling the selection thereof and further including a priority means, the priority means of like input or output types of data transfer units being interconnected via their associated data transfer unit to provide priority signals to corresponding types whereby each data transfer unit has a relative data transfer priority with respect to another data transfer unit of like type to sequentially effect the transfer of data through like types on a higher to lower priority basis in response to a selectively generated one of additional function signals repetitively applied to the priority means of said like types, the additional function signals defining time periods subsequent to the first time period, and serving to enable the transfer of data through the input and output types of data transfer units in accordance with the time periods defined thereby,
      2. decoding means responsive to prescribed system address signals to generate selection signals, each of said selection signals identifying an individual data transfer unit, and
      3. routing logic interconnecting said bus and said plurality of data transfer units, said routing logic responsive to the selection signals from said decoding means for routing a selection signal to the addressable selection means in each data transfer unit of the individually identified data transfer unit during the first time period to thereby address a data transfer unit, and further responsive to the additional function signals for selectively routing the data being sequentially transferred through the individually identified data transfer units of like type over said bus between the processing equipment and the data processor.

12. A control system of the type recited in claim 11 further including a plurality of bus interface means connected in parallel to said bus and further connected in parallel to a plurality of terminal devices for,
   a. passing the system address signals during a first time period defined by a first one of the function signals,
   b. passing the function signals, and
   c. selectively transferring data in either direction over said bus between the data processor and the processing equipment in response to a one of the additional function signals during the time periods subsequent to the first time period.

13. A control system of the type recited in claim 11 wherein each of said terminal devices further comprises, enabling means responsive to function signals on said bus and to said selection signals provided by said decoding means for selectively providing enabling signals to said decoding means, said routing logic and said data transfer unit to control the generation of said selection signals to thereby address a data transfer unit and to effect the transfer of data between the processing equipment and the data processor.

* * * * *